Dec. 18, 1956 J. M. MELICK 2,774,963

ELECTROMECHANICAL TRANSLATOR

Filed March 6, 1953 6 Sheets-Sheet 1

INVENTOR
J. M. MELICK
BY J. W. Schmied
ATTORNEY

Dec. 18, 1956 J. M. MELICK 2,774,963

ELECTROMECHANICAL TRANSLATOR

Filed March 6, 1953 6 Sheets-Sheet 2

INVENTOR
J. M. MELICK

BY

J W Schmied
ATTORNEY

Dec. 18, 1956 J. M. MELICK 2,774,963

ELECTROMECHANICAL TRANSLATOR

Filed March 6, 1953 6 Sheets-Sheet 3

INVENTOR
J. M. MELICK
BY
J. W. Schmied
ATTORNEY

Dec. 18, 1956 J. M. MELICK 2,774,963

ELECTROMECHANICAL TRANSLATOR

Filed March 6, 1953 6 Sheets-Sheet 4

INVENTOR
J. M. MELICK
BY
J W Schmied
ATTORNEY

Dec. 18, 1956 J. M. MELICK 2,774,963

ELECTROMECHANICAL TRANSLATOR

Filed March 6, 1953 6 Sheets-Sheet 5

INVENTOR
J. M. MELICK
BY
J W Schmied
ATTORNEY

Dec. 18, 1956 J. M. MELICK 2,774,963

ELECTROMECHANICAL TRANSLATOR

Filed March 6, 1953 6 Sheets-Sheet 6

INVENTOR
J. M. MELICK
BY J. W. Schmied
ATTORNEY

United States Patent Office 2,774,963 Patented Dec. 18, 1956

2,774,963

ELECTROMECHANICAL TRANSLATOR

John M. Melick, Cresskill, N. J., assignor to Bell Telephone Laboratories, Incorporated, New York, N. Y., a corporation of New York Application March 6, 1953, Serial No. 340,717

9 Claims. (Cl. 340—365)

This invention relates to translators and more particularly to electromechanical translators wherein the output registration is controlled by operation through aligned holes in translator cards.

Translators are employed in telephone practice to effect interconnection between different automatic telephone systems, or between two automatic telephone exchanges employing different combinations of code groups or for many other operations in automatic telephone offices. As more automatic telephone dial exchanges are interconnected in an expanding network, the necessity for rapid and reliable translation of one signaling code to another becomes increasingly important. The use of electromechanical card translators of the type herein disclosed allows such changes to be accomplished merely by removing one card from the translator and replacing it with another card having differently coded perforations.

A translator of this type has a fundamental advantage over former types of translators wherein complicated systems of relays and other apparatus were employed. Such systems when used in telephony for translating each of ten thousand numbers into other numbers become extremely unadaptable to changes in individual translations or changes in cross-connections. By means of the card translator these changes may be made by substituting one card for another.

Heretofore in the prior card translator art, as exemplified by the patent to Myers, Patent No. 2,558,577, which issued on June 26, 1951, and by the application to Gent-Myers, Serial No. 784,024, filed November 4, 1947, which issued on February 9, 1954 as Patent 2,668,877, photoelectric effects were utilized to register the output information. Considerable difficulty was encountered in obtaining a photocell mechanically small enough to meet the exacting space requirements and yet electrically having sufficient output to operate the various tubes and relays which furnish the output information. Moreover the associated apparatus required by the photoelectric systems such as prisms, photocells, lamps, reflectors, fans, etc., are bulky, expensive and difficult to maintain.

It is, therefore, an object of the present invention to provide for a novel card translator that is comparatively simple in construction, compact in form, and inexpensive to build which does not use photoelectric means for providing an output.

Another object of the invention is to provide a translator capable of rapidly providing a large number of selections for translating input signals received in one code to output signals in a different code, such as may be employed in telephone central office switching and similar applications.

Still another object of this invention is to provide an electromechanical card translator in which any selected card may be removed for replacement by another card bearing a different set of coded designations.

The present invention accomplishes these objects and overcomes the difficulties presented by the prior art by providing for a card translator having a plurality of rigid metallic contact members inserted through the holes or perforations in the cards or plates in such a manner that the contact members are separated therefrom. Coding of the cards is accomplished by having different sized openings so that when a selected one of the cards is moved down in translation, the upper edges bordering the small holes come into contact with the metallic contact members. The cards themselves being metallic conductors act to ground the contact and actuate output register relays which are essentially connected in series with a potential source and the contact member. When the selected card is restored to its normal position within the card stack these ground contacts are removed and all of the output relays unless they are locked up may restore to normal. The cards are also magnetic to aid the magnetic selector apparatus to move the card from alignment in the stack.

It is then another object of the present invention to provide for a novel card translator wherein the cards provide a direct-acting contact closure.

A feature of the present invention relates to the provision of a novel card translator in which the selected cards are part of the electrical circuit.

Another feature of the present invention pertains to the provision of a novel card translator having metallic cards having only a regular series of perforations with some of the perforations being reduced and with each perforation enclosing a metallic contact member.

Further features, objects and advantages will become apparent upon a consideration of the following description taken in conjunction with the drawings where:

Figure 1:
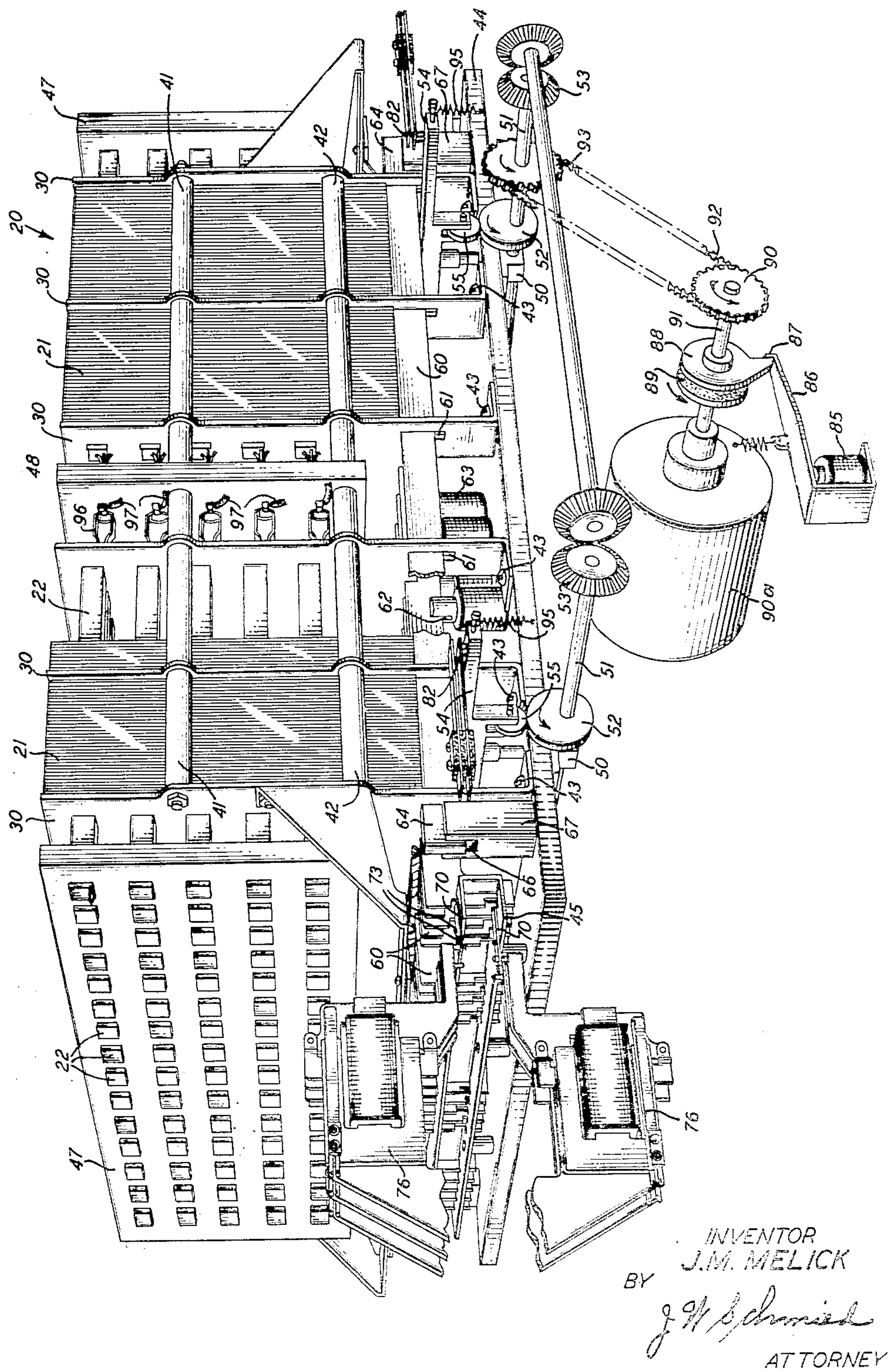
Fig. 1 is a partial view in perspective of the translator of the present invention.
Figure 5:
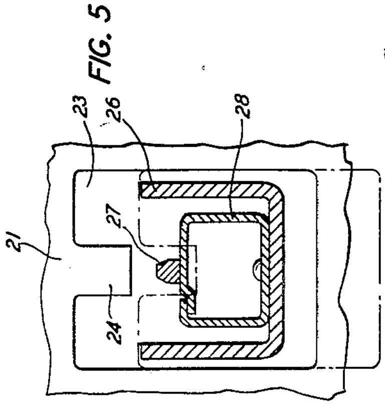
Fig. 5 is an enlarged sectional view of a contact finger and support illustrating the positions of a card with respect thereto.
Figure 6:
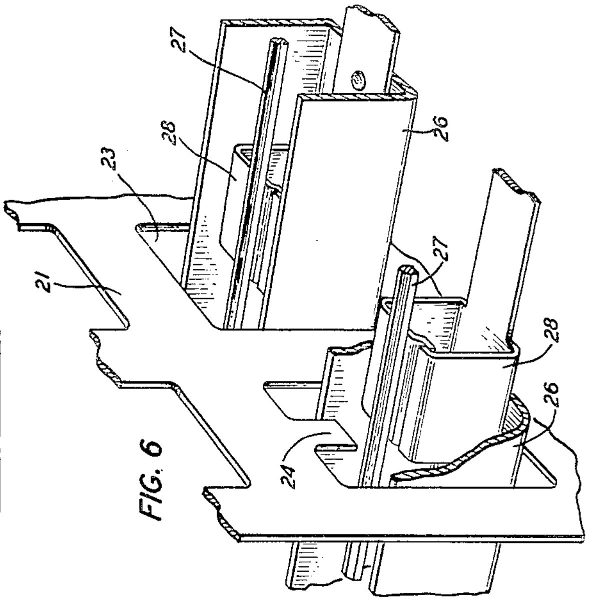
Fig. 6 is an enlarged partial view in perspective of the finger supports.

Referring to Fig. 1 the card translator 20 has a plurality of cards or plates 21 which are moved vertically, as is hereinafter described, to selectively make contact with some of the contact finger assemblies 22. As shown more specifically in Figs. 3 through 6 the contact finger assemblies 22 pass horizontally through openings or apertures 23 of the cards 21. There are, in the preferred embodiment, seventy-five contact finger assemblies 22 which extend through the aligned holes 23 in the stack of cards 21. The individual cards 21 are coded by tabs 24 at the tops of the apertures 23 essentially reducing the size of the apertures 23. When the cards 21 are lowered they therefore make contact with a definite combination of contact finger assemblies 22 according to the tabs 24. Each contact finger assembly 22 has an insulating support channel 26 which flexibly supports contact bar 27. The bar 27 is mounted on the contact tension spring 28 which is in turn rigidly attached to the insulating support 26. When a card 21 is moved down to a position indicated in Figs. 4 and 5, the coded tabs 24 thereon make contact with some of the bars 27, depressing the corresponding springs 28. Of the seventy-five possible contacts that are possible, the number in the present modification that the card 21 shown in Fig. 3 makes contact with is twenty. The twenty assemblies 22 with which contact is made are the illustrated assemblies 22 therein.

Due to the manufacturing variations in the location of the card tabs 24 and the contact bars 27, all of the twenty contacts will not be made simultaneously. For example, the first contact closes when a card 21 has traveled downwardly approximately 1/32 of an inch and the last contact closes within 3/32 of an inch of travel. When a card 21 moves a total of 1/8 of an inch the contact bars 27 will therefore be depressed from 1/32 of an inch to 3/32 of an inch with all of the tabs 24 of the respective card 21 definitely making contact.

Figure 2:
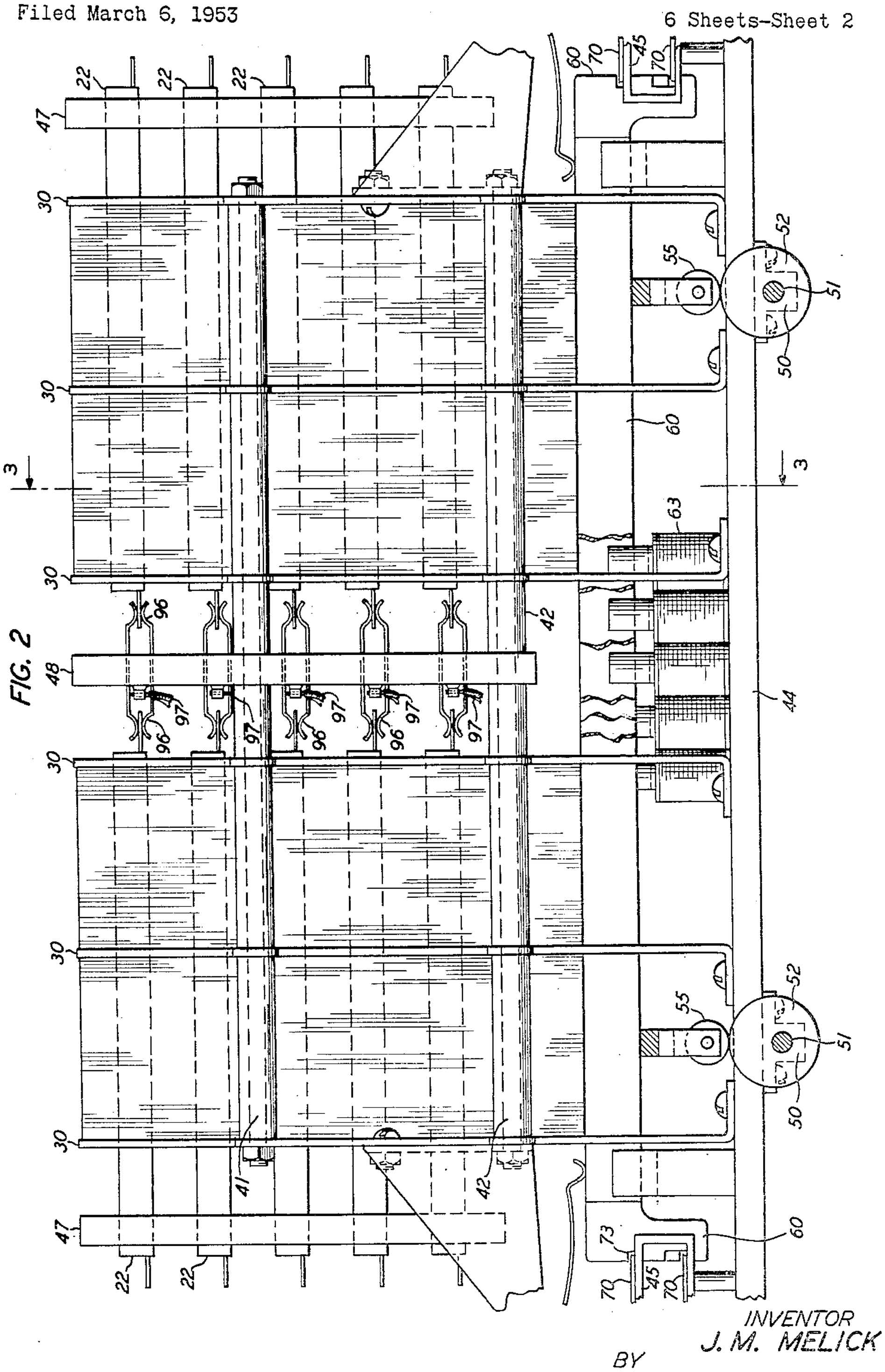
Fig. 2 is a side view of the translator of the present invention.

In the preferred embodiment the insulating support channels 26 are supported every 1½ inches by card spacer guides 30, at each end by a terminal plate 47 and at the center by a central terminal plate 48, as shown in Figs. 1 and 2. The insulating supports 26 of the contact assemblies 22 are rigidly attached to the terminal plates 47 but are movable, as is hereinafter described, with respect to the central terminal plate 48 so that the obvious necessity of withdrawing the contact finger assemblies 22 when a card 21 is to be removed or inserted can be achieved. The terminal plates 47 are movable with respect to the stationary bottom plate 44 to facilitate the simultaneous removal of the contact finger assemblies 22. Stops, not shown, can be provided to limit the travel of the contact assemblies 22 so that the ends thereof remain in the end stationary spacer guide plates 30 when the assemblies 22 are withdrawn from the stack.

The holes or perforations 23 of the cards 21 provide a minimum clearance of .01 inch at the sides, .125 inch above and .062 inch below the insulating support channels 26 of the assemblies 22. A contact finger assembly 22 described above has a 9/32 inch by 11/32 inch cross-section so that the individual holes in the cards would be approximately .370 inch horizontal and .475 inch vertical. Approximately 3/16 of an inch is allowed between perforations 23, for borders and for tabs 40, hereinafter described. A card 21 which is 9 inches by 5 inches would provide for the horizontal rows of fifteen holes 23 and the vertical columns of five holes 23. The present invention is not restricted to the exact measurements described above as to the card size, hole size, spacings, etc., as these measurements are described only as an illustrative embodiment.

The cards 21 are maintained horizontal in position by means of the card guides 41 and 42 which are bolted to the end card spacer guides 30. The card spacer guides 30 are in turn bolted at 43 to the bottom plate 44. The bottom plate 44 also supports the bearings 50 in which two actuating shafts 51 can rotate. The shafts 51 each has attached thereto a code bar actuator cam 52 and a bevel gear 53. The cams 52 support two code bar actuators 54 by means of the rollers 55, and the bevel gears 53 provide input power to one of the shafts 51, as is hereinafter described, and maintain the two shafts 51 in synchronism. The movement of the actuators 54 causes a plurality of code bars 60 to move up or down, as is hereinafter described, to select one of the cards 21. The code bars 60 are guided in their movements at the ends by the end guide combs 45, at every 1½ inches in the slots 61 which are in the bottom of the code bar spacer guides 30, described above, and at the bottom by the slots 62 of the code bar magnets 63, hereinafter described. In addition to the code bars 60 which perform, as is hereinafter described, the selection of a card 21, two common code bars 64 are provided, one at each side of the card translator. The common code bars 64 are similarly moved and guided as the code bars 60 with the exception that they are guided at each end in a slot 66 of a pole-piece 67. Each of the cards 21 has two end tabs 83, shown in Fig. 3, which are supported by the common code bars 64. There are twenty code bars 60 which are approximately 3/32 of an inch thick and located on .2 inch centers. The magnets 63 are staggered along the code bars 60 to permit mounting on these centers.

Figure 8:
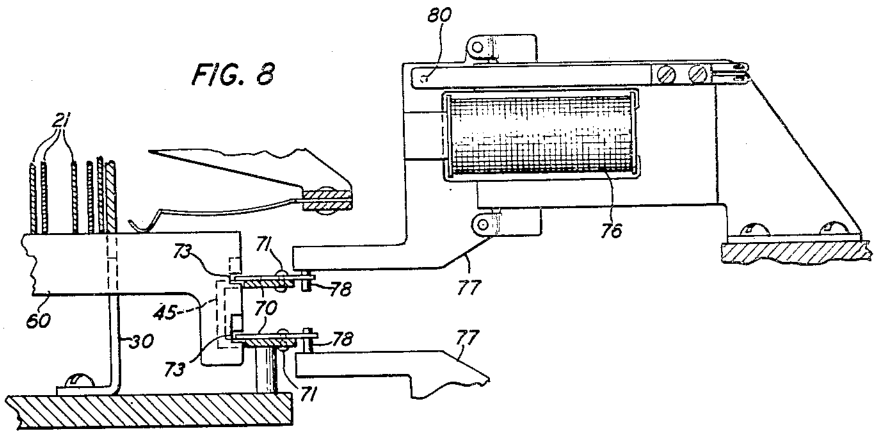
Fig. 8 is a side view of the contact structure and interposers.
Figure 9:
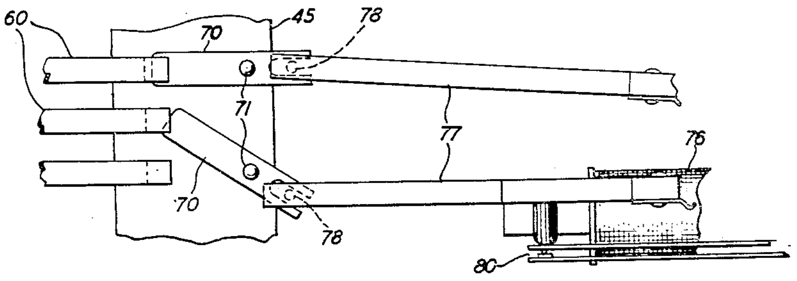
Fig. 9 is an enlarged top view of a portion of the contact structure and interposers with one interposer operated.

The code bars 60 are normally prevented from following the code bar actuators 54 in its downward movement by the interposers 70 shown more specifically in Figs. 1 and 7 through 9. The interposers 70 are pivoted at points 71 on the end guide combs 45 and normally block the guiding slots in the end guide combs 45 so that the code bars 60 are supported thereby when the actuators 54 are lowered. Each of the code bars 60 has two slots 73 at each end, as shown in Figs. 1, 2 and 8. One of the two slots 73 is a wide slot and one is a narrow slot. Adjacent code bars 60 have the positions of the wide and narrow slots 73 alternated as shown in Fig. 1. The interposers 70 are normally inserted in the narrow slots 73 preventing the downward movement of the code bars 60 being mounted in two layers with each layer engaging alternate code bars 60. When an interposer 70 is pivoted the corresponding narrow slot 73 is freed and the interposer 70 is partially inserted in the wide slot 73 of the adjacent code bar 60 as shown in Fig. 9. If the adjacent code bar 60 is lowered after the rotation of its respective interposer 70 (not shown in Fig. 9), the width of the slot 73 is sufficient to prevent interference or blocking by this rotated interposer 70. The code bars 60 are supported by the actuators 54 so that the interposers 70 have clearance to operate in a rapid manner. The interposers 70 are operated by small fast interposer magnets 76 through the armatures 77 and pins 78 which connect the armatures 77 to the interposers 70. The associated interposer magnets 76 at each end of a code bar 60 are wired (not shown) for simultaneous operation. This construction of having small magnets at each end of the code bars 60 allows for fast operation. When the interposers 70 are actuated the interposer check contacts 80 are closed to provide an indication of the successful operation of the interposers 70.

Figure 3:
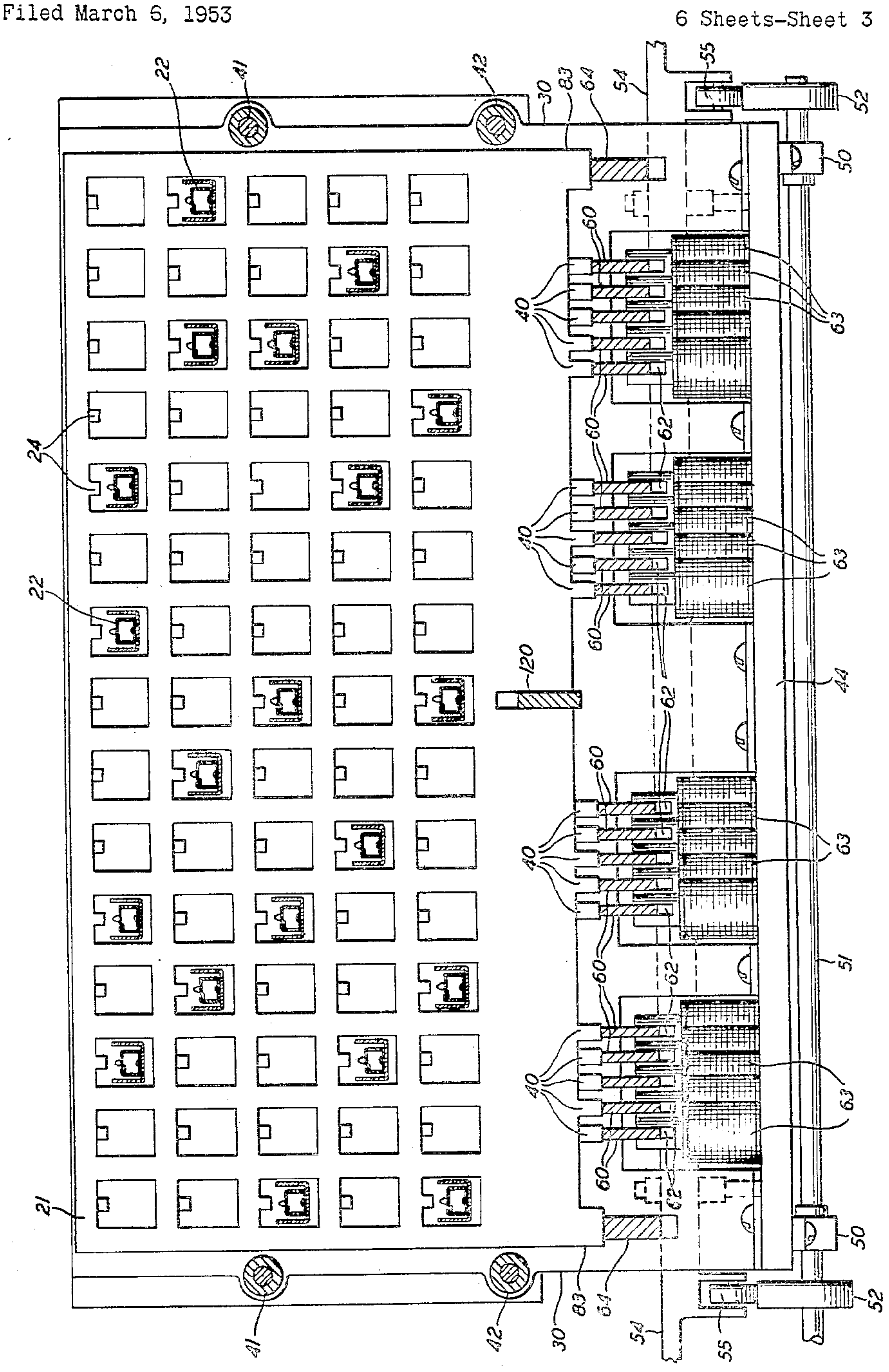
Fig. 3 is a sectional view along line 3—3 in Fig. 2 with the cards in normal position.
Figure 4:
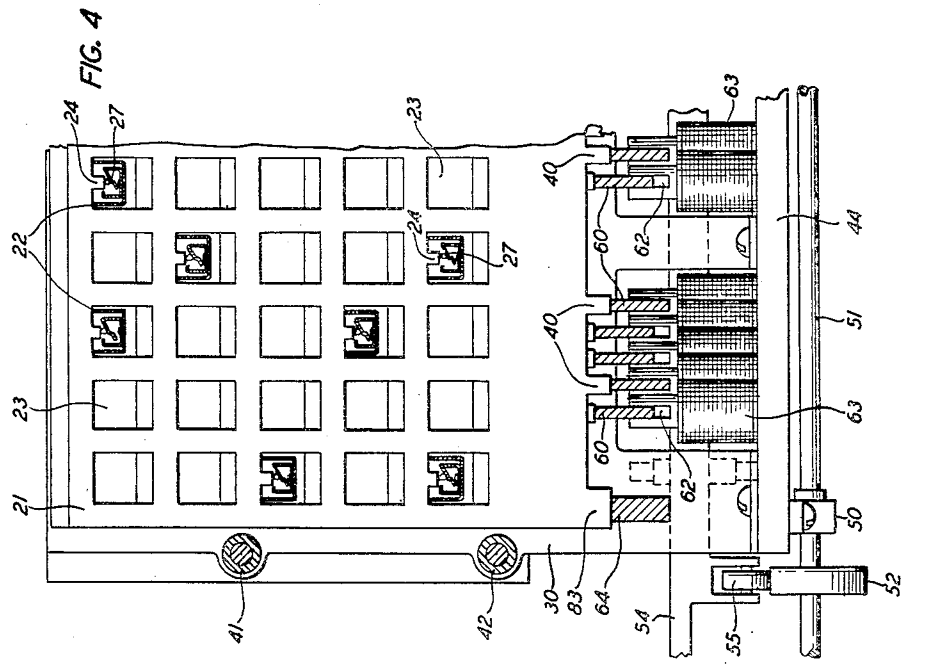
Fig. 4 is a partial sectional view along line 3—3 in Fig. 2 with one card lowered.
Figure 7:
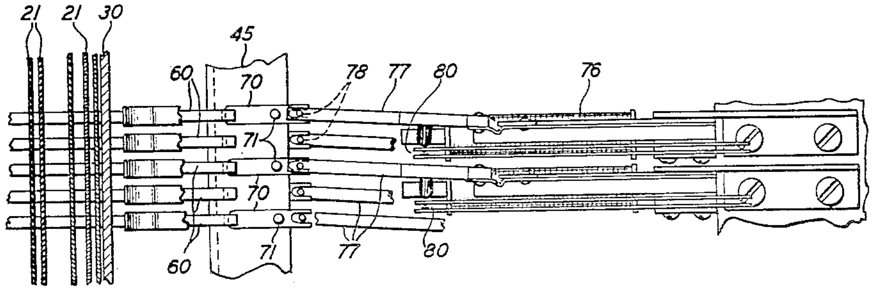
Fig. 7 is a top view of the contact structure and interposers.

When the interposers 70 are rotated due to the energization of the magnets 76 and the actuator 54 is lowered the code bars 60 corresponding to the rotated interposers 70 are lowered. The cards 21 are coded by means of the tabs 40 described above as they make contact with only certain of the code bars 60. Referring specifically to Figs. 3 and 4 each card 21 has eight tabs 40 or four groups of two-out-of-five tabs. For example, on the card 21 shown in the Figs. 3 and 4 from left to right of the figures, the first group has the second and fifth tabs 40, the second group has the second and third tabs 40, the third group has the first and third tabs 40, and the fourth and last group has the first and second tabs 40. Only when the corresponding code bars 60, with respect to these tabs 40, are lowered can this card 21 be moved. For each different combination of eight code bars 60 that are actuated, a different card 21 is selected. The present invention is not necessarily restricted to the use of a two-out-of-five code as any code may be used to select a card 21.

A high pull on a selected card 21 is obtained by the iron-to-iron contact between the magnets 63 described above and the card 21 when the card 21 is moved out of the stack. In the first group, for example, when the second and fifth code bars 60 are lowered, the second and fifth magnets 63 are simultaneously energized, as is hereinafter described in the sequence of operations, and two closed magnetic paths through the card 21 result. One of the magnetic paths is through the second magnet 63 of the first group, through the corresponding code bar 60 and tab 40, card 21, tab 83, common code bar 64, card spacer 30, plate 44, back to the second magnet 63. The second magnetic path is through the fifth magnet 63, code bar 60 and tab 40 with the remaining components being the same as in the first magnetic path. These magnetic paths are not broken when the card 21 commences its downward movement and instead the reluctance of the magnetic path is decreased. If magnetic iron is employed with the cards 21, .01 inch thick, and the code bars 60, 3/32 of an inch wide, each code bar would exert a pull of 55 grams on the associated card tab 40 when magnetically saturated at the contacting point. As eight code bars 60 will be magnetized in the translator of the preferred embodiment, the total pull on the selected card 21 will be approximately 440 grams which is more than sufficient to pull the selected card 21 out of the stack. By means of the coding scheme as provided by the tabs 40 the pull on the selected card 21 is greater than that on any other card 21. The pull on the selected card 21 would be approximately 100 grams, while the code bars 60 were in contact with all of the cards 21. As the code bars 60, however, break away from the unselected cards 21, the flux tends to concentrate in the selected card 21 and the pull rises to the 440-gram value. In the above considerations it would not be practicable for all of the card tabs 40 to touch all of the code bars 60 but this gap can be maintained to a maximum of .005 inch quite easily.

The sequence of operations which takes place to provide for a translation commences at the home position contacts 82 shown in Fig. 1. The home position contacts 82 indicate to the external circuitry, not shown, that the translator is ready for seizure and a connection is made thereby to the interposer magnets 76 described above in approximately 8 milliseconds. The interposers 70 are actuated or rotated and the interposer check contacts 80 operate relays, not shown, in the interposer check circuit, also not shown, to provide a check for the operation of the interposers 70. This procedure also takes approximately 8 milliseconds. The successful operation of the check circuit causes the energization of the clutch latch magnet 85 shown in Fig. 1. When the clutch magnet 85 is operated the armature 86 and clutch latch 87 is pulled down allowing the clutch 88 to rotate with the disc 89 of the motor 90A. The motor 90A causes the disc 89 to rotate in a counter-clockwise manner as shown in Fig. 1 so that when the clutch 88 is allowed to rotate therewith a gear 90 mounted on a common clutch shaft 91 also rotates in a counter-clockwise manner. The gear 90 engages the belt or chain 92 which in turn engages another gear 93. The gear 93 is mounted on one of the actuating shafts 51 as described above. The actuation therefore of the clutch latch magnet 85 causes the rotation of the actuating shafts 51; one of them directly by means of the gears 90 and 93 and the other by means of the beveled gears 53 described above. The time for the energization of the clutch latch magnet 85 is approximately 10 milliseconds and for single revolution of the clutch shaft 91 is approximately 50 milliseconds. The actuating shafts 51 are both rotated in a counter-clockwise manner rotating the cams 52 therewith. The rotation of the cams 52 allows the code bar actuators 54 to descend by means of the action of the restoring springs 95. Since eight interposers 70 have been rotated at each side of the translator and eight of the magnets 63 were energized at the same time, eight code bars 60 descend with the code bar actuators 54. The descent of the eight code bars 60 allows one and only one of the cards 21 to descend therewith as described above. As the card 21 descends, twenty tabs 24 make contact with twenty of the contact bars 27 of the assemblies 22. The tabs 24, for example, shown in Fig. 3, make contact with the twenty assemblies 22 shown illustrated when the card 21 is lowered. A portion of the card 21 of Fig. 3 is also shown in Fig. 4 in its lowered position making contact with the bars 27 of the assemblies 22.

Figure 10:
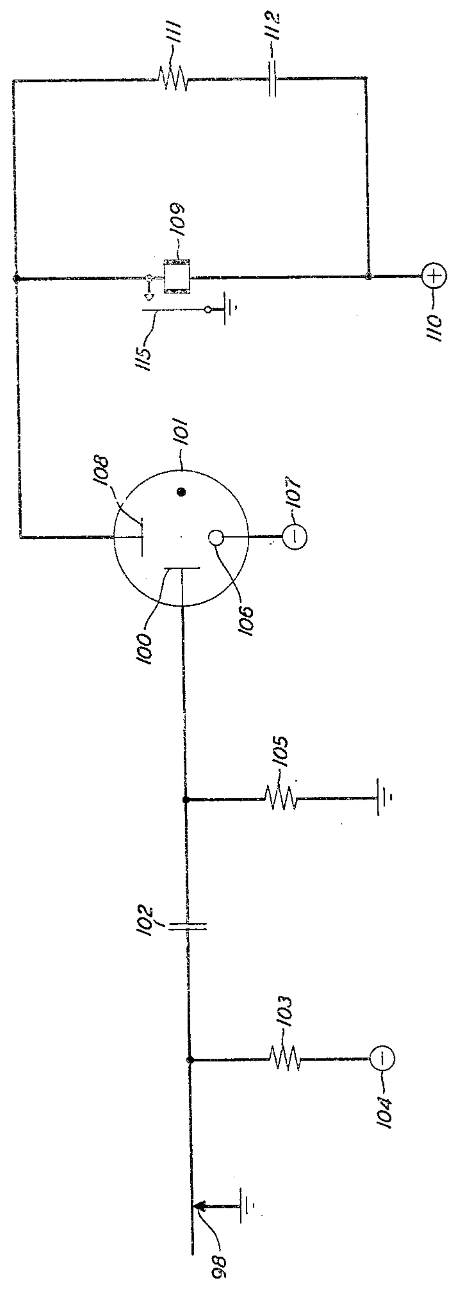
Fig. 10 is a circuit diagram of the output relay illustrating the grounding of the operated card.

The bars 27 are inserted at their central end in a jack 96. The jacks 96 are mounted on the central terminal plate 48 described above and make electrical contact with leads or wires 97 shown in Figs. 1 and 2. The position of the wires 97 in the circuit diagram of Fig. 10 is shown at control point 98. When the tab 24 of a card 21 makes contact with the bar 27 it essentially grounds the wire 97 as shown by the contact at point 98 in Fig. 10. Point 98 is connected to the starting anode 100 of the gaseous triode 101 through a capacitor 102 and also through the resistor 103 to a negative potential 104 of −130 volts. The starting anode 100 is connected to ground through the resistor 105, the cathode 106 to a negative potential 107 of −48 volts and the anode 108 through the relay 109 to the positive potential 110 of 130 volts. The relay 109 is paralleled by the series combination of the resistor 111 and capacitor 112. When point 98 is grounded in a manner as described above, the potential upon the starting anode 100 is instantaneously raised, initiating ionization in the triode 101 and thus operating the relay 109. Once the relay 109 is operated it is locked in position due to the grounding of its armature 115. Each tab 24 making contact with the bar 27 causes the operation of a relay 109. When the code bar actuators are lowered the home position contacts 82 are opened and indicate to its associated circuitry (not shown) that the interposer magnets 76 may be released. The interposers 70 therefore are restored as the clutch 88 completes its revolution. As the clutch 88 completes its revolution the actuator 54 and code bars 60 and 64 are also restored to normal with the interposers 70 relocking the code bars 60 in the raised or normal position. When the interposers 70 are restored to normal the interposer check contacts 80 are opened so that they may be checked for the next cycle of operations. The time for the interposers 70 restoral and check is approximately 12 milliseconds or a total operating time for the cycle of approximately 88 milliseconds.

The coding in the translator may be readily changed by changing the tabs 24 or by changing the card 21 which is essentially the same thing. The removal of the card 21 is achieved only when the contact assemblies 22 are removed as described above. A kick-out bar 120, shown in Fig. 3, is provided for the removal of a card, but the operating mechanism therefore is not shown. A card extractor magnet, also not shown, can be provided to assist in the removal or the change of the cards 21. An alternate method of exchanging cards 21 can be provided which would eliminate the necessity of pulling the contact assemblies 22 out of the card stack each time a card 21 is removed. A tab or other identifying means can be added to the card 21 that is required to be removed to identify a dropped card 21 from the rest of the cards 21 in the stack. All of the identified cards 21 could be removed at one time.

It is to be understood that the above-described arrangements are illustrative of the application of the principles of this invention. Numerous other arrangements may be devised by those skilled in the art without departing from the spirit and scope of the invention as for example the cards 21, tabs 40 and 24, relays 109, etc., can be varied in number and combinations.

What is claimed is:

1. A card translator comprising a plurality of perforated metallic cards; a plurality of stationary contact members passing through said metallic cards; means for selecting any one of said metallic cards; and means for moving said selected card to cause said selected card to make electrical contact with an individual combination of some of said plurality of contact members.

2. A translating device comprising a plurality of perforated metallic cards with the perforations of said cards being in alignment when said cards are stacked, each of said cards having a plurality of coding tabs effectively reducing the size of some of said perforations of said cards; means for holding said cards in alignment when said cards are stacked; individual metallic contact members extending through said aligned cards, but normally not in contact therewith; and means for selectively displacing any one of said cards to effectively make electrical contact with said contact members corresponding to said coding tabs.

3. An electromechanical translator comprising electromagnetic input and output devices; a stack of perforated conductive cards where the perforations are aligned; a plurality of conductive coding tabs adjacent some of said perforations of each of the cards of said stack of cards effectively reducing the size of said perforations; a plurality of stationary conductive bars connected to said output devices and inserted through said aligned perforations but not making contact with said cards; and selecting means including said input devices for selecting and moving any one of said cards causing said tabs on said cards to come in contact with said conductive bars corresponding to said effectively reduced perforations of said selected cards to change the potential of said bars and thereby to actuate said output devices.

4. An electromechanical card translator having input and output devices; a stack of perforated conductive cards, certain of said perforations being smaller than the rest of said perforations; stationary conductive bars inserted through said aligned perforations and connected to said output devices; and means controlled by said input devices for selectively modifying the aligned position of said apertures in such a manner as to ground said conductive bars corresponding to said smaller perforations of one of said cards to actuate said output devices connected to said grounded conductive bars.

5. A card translator having a plurality of output circuits; a plurality of perforated conductive cards; normally disabled connection connected to said output circuit and passing through the perforations of said cards; selecting means for selecting any one of said conductive cards; and means including said selecting means for enabling said connections by inserting the selected one of said cards in some of said output circuits.

6. A translating arrangement comprising input apparatus; a plurality of output devices; a plurality of stacked metallic cards, perforations in all of said cards of a size in accordance with a distinctive code for each card; means for maintaining said cards in stacked relation with all of the perforations aligned; means for selectively displacing any one of said cards while maintaining the rest of said cards in stacked relation by operation of said input apparatus; and means operable through the perforations of a displaced card to control operation of said output devices.

7. An electromechanical translator comprising a stack of conductive cards; each card of said stack of conductive cards having a distinctive set of coding tabs; a plurality of code bars supporting said stack of conductive cards by means of said tabs; a plurality of output circuits each having a normally unterminated lead and at least one output device connected to said lead and associated in combination with said cards; and selecting means including said code bars and said tabs for dropping any one of said conductive cards to directly contact said lead and thereby to cause the operation of the corresponding ones of said output devices.

8. A card translator comprising a plurality of perforated metallic cards; a plurality of resiliently supported contact members passing through the perforations of said metallic cards; means for selecting any one of said cards; and means for moving said selected card to make contact with an individual combination of some of said contact members.

9. A card translator comprising a plurality of conductive cards, a plurality of output circuits, each of said circuits having a normally ungrounded lead, means for selecting any one of said conductive cards, means controlled by said selecting means for moving said selected card to make contact with and ground an individual combination of said leads.

References Cited in the file of this patent

UNITED STATES PATENTS

| | | |
|---|---|---|
| 352,143 | Munson | Nov. 9, 1886 |
| 1,041,174 | Von Saalfeld | Oct. 15, 1912 |
| 2,267,936 | Marrison | Dec. 30, 1941 |
| 2,361,246 | Stibitz | Oct. 24, 1944 |
| 2,361,859 | Mallina | Oct. 31, 1944 |
| 2,455,783 | Lang | Dec. 7, 1948 |
| 2,483,281 | Herr | Sept. 27, 1949 |
| 2,528,161 | Miloche | Oct. 31, 1950 |